(12) United States Patent
Abbasi et al.

(10) Patent No.: US 8,597,384 B2
(45) Date of Patent: Dec. 3, 2013

(54) GASIFICATION COOLING SYSTEM HAVING SEAL

(75) Inventors: Yasir Hafeez Abbasi, Houston, TX (US); Cliff Yi Guo, Houston, TX (US); Wade Albert Taber, Katy, TX (US); Xinyuan Zhang, Houston, TX (US)

(73) Assignee: General Electric Company, Schenectady, NY (US)

( * ) Notice: Subject to any disclaimer, the term of this patent is extended or adjusted under 35 U.S.C. 154(b) by 997 days.

(21) Appl. No.: 12/567,661

(22) Filed: Sep. 25, 2009

(65) Prior Publication Data

US 2011/0072720 A1 Mar. 31, 2011

(51) Int. Cl.
*B01J 7/00* (2006.01)
*C10B 1/00* (2006.01)
*F28F 1/00* (2006.01)

(52) U.S. Cl.
USPC ...... 48/119; 48/61; 48/89; 165/177; 432/247; 432/251

(58) Field of Classification Search
USPC .......... 48/127.9, 127.1, 61, 89, 119; 165/157, 165/177
See application file for complete search history.

(56) References Cited

U.S. PATENT DOCUMENTS

| | | | | |
|---|---|---|---|---|
| 3,043,055 A | * | 7/1962 | Davey | 52/127.4 |
| 3,350,085 A | * | 10/1967 | Over | 266/283 |
| 4,637,823 A | * | 1/1987 | Dach | 48/77 |
| 4,828,580 A | | 5/1989 | Dach | |
| 4,875,712 A | * | 10/1989 | Oda et al. | 285/47 |
| 5,011,166 A | * | 4/1991 | Watts | 277/379 |
| 5,024,421 A | * | 6/1991 | Cooley | 266/210 |
| 5,779,989 A | * | 7/1998 | Tomasicchio et al. | 422/145 |
| 5,873,329 A | | 2/1999 | Heering et al. | |
| 2005/0166590 A1 | * | 8/2005 | Alderson et al. | 60/516 |
| 2007/0119577 A1 | | 5/2007 | Kraft et al. | |
| 2008/0041572 A1 | | 2/2008 | Wessel | |
| 2008/0042373 A1 | | 2/2008 | Wilson | |
| 2008/0175770 A1 | | 7/2008 | Wallace | |
| 2008/0308170 A1 | * | 12/2008 | Bock et al. | 138/121 |
| 2009/0166975 A1 | | 7/2009 | Russell | |

FOREIGN PATENT DOCUMENTS

| | | |
|---|---|---|
| DE | 202007007491 U1 | 8/2007 |
| EP | 0763589 A1 | 3/1997 |
| EP | 0777098 A2 | 6/1997 |
| WO | 2007/055930 A2 | 5/2007 |

OTHER PUBLICATIONS

PCT Search Report issued in connection with corresponding WO Patent Application No. US10/45185 filed on Aug. 11, 2010.

* cited by examiner

*Primary Examiner* — Matthew Merkling
(74) *Attorney, Agent, or Firm* — Fletcher Yoder, P.C.

(57) ABSTRACT

A system, in certain embodiments, includes a gasification cooling system having an annular seal with a bellows. For example, the gasification cooling system may include a housing with an inlet, an outlet, and an interior between the inlet and the outlet, wherein the interior has a throat adjacent the inlet, and the throat expands in a flow direction from the inlet toward the outlet. The annular seal may be disposed in the throat of the housing, wherein the annular seal includes the bellows.

20 Claims, 5 Drawing Sheets

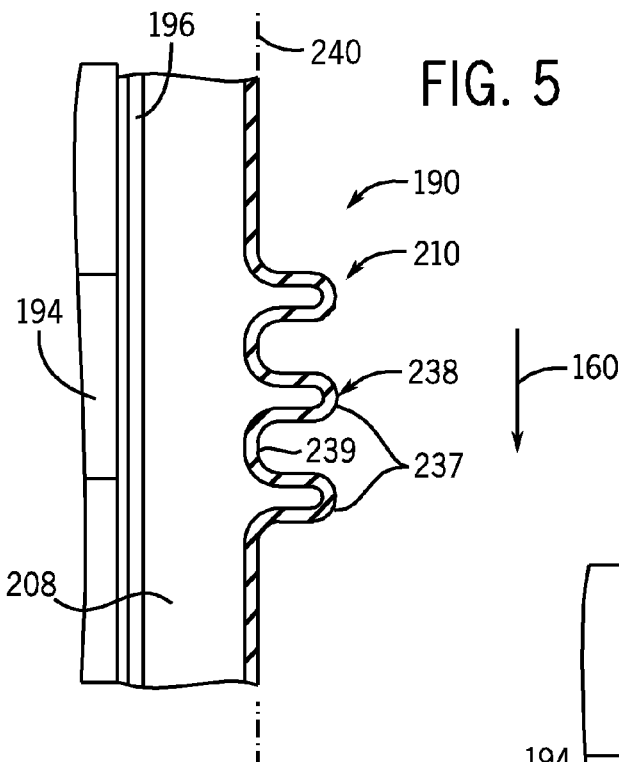
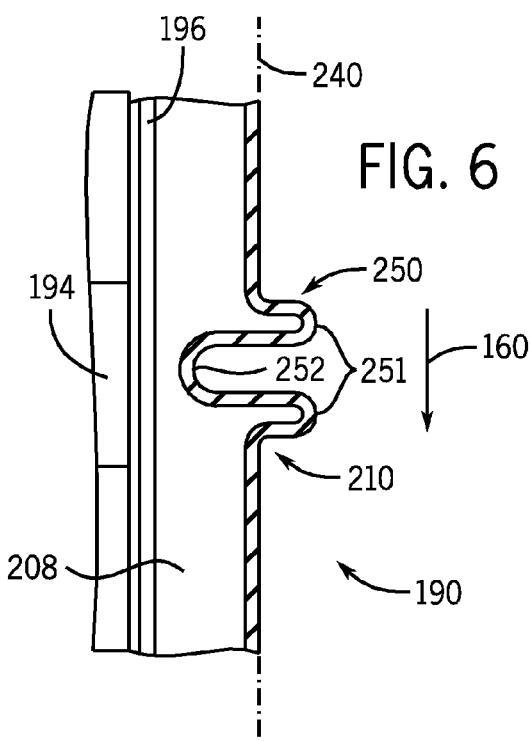
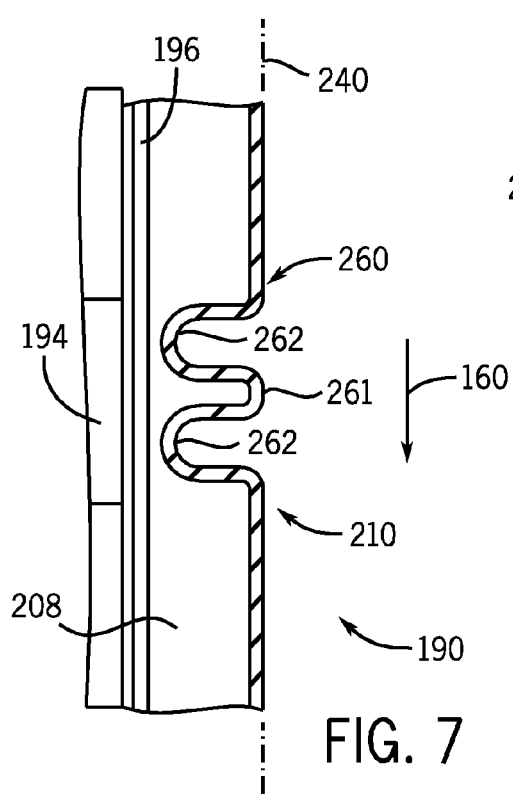

GASIFICATION COOLING SYSTEM HAVING SEAL

BACKGROUND OF THE INVENTION

The subject matter disclosed herein relates to gasification cooling systems, such as radiant syngas coolers, which cool gas from a gasifier.

Integrated gasification combined cycle (IGCC) power plants are capable of generating energy from various hydrocarbon feedstock, such as coal, relatively cleanly and efficiently. IGCC technology may convert the hydrocarbon feedstock into a gas mixture including carbon monoxide (CO) and hydrogen ($H_2$), e.g., syngas, by reaction with steam in a gasifier. These gases may be cooled, cleaned, and utilized as fuel in a conventional combined cycle power plant. For example, a radiant syngas cooler (RSC) may receive and cool the syngas upstream from a water gas shift reactor and/or other gas cleaning units. Unfortunately, the high temperature of syngas entering a throat of the RSC can potentially damage heat exchanger tubing and/or the body of the RSC without sufficient thermal protection. Furthermore, thermal changes in the RSC can cause significant thermal expansion and contraction, which complicate the design for thermal protection in the throat of the RSC.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification cooling system having a housing with an inlet, an outlet, and an interior between the inlet and the outlet. The interior has a throat adjacent the inlet, and the throat expands in a flow direction from the inlet toward the outlet. The gasification cooling system also has an annular seal disposed in the throat of the housing, wherein the annular seal has a bellows.

In a second embodiment, a system includes a gasification cooling system having a housing with a gas passage extending in a flow direction lengthwise along the housing, a first plurality of thermally insulative bricks disposed about the gas passage, a bellows seal disposed about the first plurality of thermally insulative bricks, and a plurality of heat exchanger tubes disposed downstream from the bellows seal. The bellows seal is configured to expand and contract in response to thermal contraction or expansion of the plurality of heat exchanger tubes.

In a third embodiment, a system includes a gasification cooling system having a housing with a gas passage extending in a flow direction lengthwise along the housing and a first plurality of thermally insulative bricks disposed about the gas passage. The gasification cooling system also includes a second plurality of thermally insulative bricks disposed about the first plurality of thermally insulative bricks, wherein the second plurality of thermally insulative bricks is axially staggered relative to the first plurality of thermally insulative bricks, and the second plurality of thermally insulative bricks includes an interlocking interface between adjacent bricks. The gasification cooling system also includes a thermally insulative liner disposed about the second plurality of thermally insulative bricks, a bellows seal disposed about the thermally insulative liner, and a thermally insulative material disposed between the thermally insulative liner and the bellows seal. The gasification cooling system further includes a plurality of heat exchanger tubes downstream of the bellows seal, wherein the bellows seal is configured to expand and contract in the flow direction.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a cross-sectional view of an embodiment of the annular seal having the bellows with outward protruding annular grooves;

FIG. 6 is a cross-sectional view of an embodiment of the annular seal having the bellows with inward and outward protruding annular grooves; and FIG. 7 is a cross-sectional view of an embodiment of the annular seal having the bellows with inward protruding annular grooves.

DETAILED DESCRIPTION OF THE INVENTION

Figure 1:
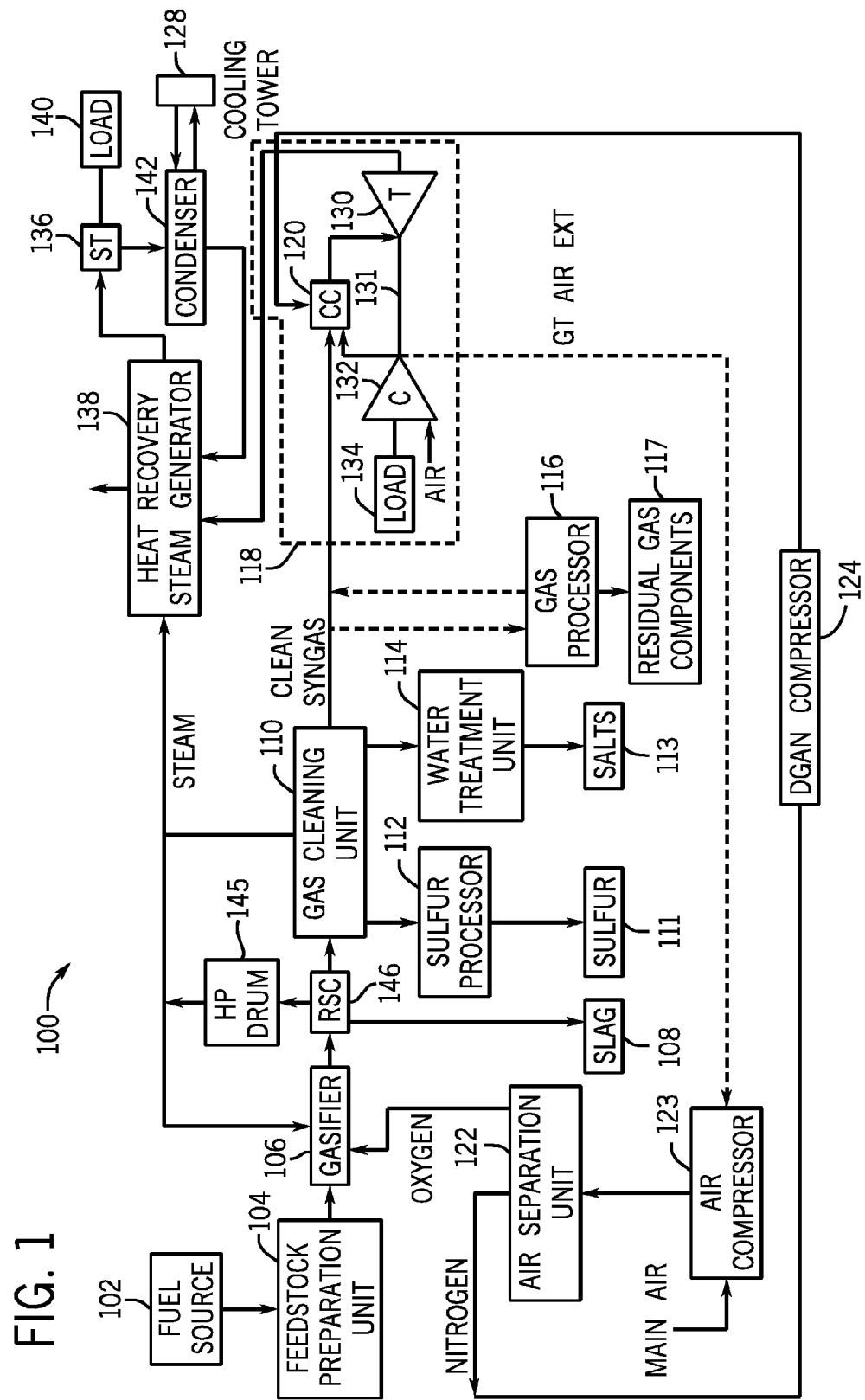
FIG. 1 is a block diagram of an embodiment of an integrated gasification combined cycle (IGCC) power plant including a radiant syngas cooler (RSC)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As described below, the disclosed embodiments may include an annular seal having a bellows, which expands and contracts in response to movement (e.g., thermal expansion and contraction). The bellows may be disposed in a variety of systems and devices, such as those found in industrial equipment, power plants, or other applications. For example, the annular seal may be mounted within a gasification cooling system, such as a radiant syngas cooler (RSC), configured to cool syngas originating from a gasifier in an integrated gasification combined cycle (IGCC) power plant. In certain embodiments, the annular seal may be mounted within a throat region of the RSC to block leakage of the syngas into a dome chamber and elsewhere inside the RSC. For example, the annular seal may block leakage of the syngas from reaching heat exchanger tubing and/or walls of the RSC. As appreciated, the RSC may be subject to considerable variations in temperature, which may cause thermal expansion and contraction, and thus movement of components, inside the RSC. The bellows of the annular seal expands and contracts in response to these movements, thereby maintaining a constant seal to block leakage of the syngas. In certain embodiments, the bellows of the annular seal includes an alternating diameter that radially increases and decreases in a direction of syngas flow through the RSC. In one embodiment, the alternating diameter of the bellows radially increases and decreases both greater than and less than a base diameter. In other embodiments, the alternating diameter of the bellows radially increases and decreases either only less than or only greater than the base diameter. However, the bellows may have other configurations within the scope of the disclosed annular seal.

In certain embodiments, a refractory system may be used in conjunction with the annular seal in the RSC to ensure that hot syngas entering the RSC does not thermally damage the annular seal. For instance, the refractory system may include a variety of refractory materials capable of maintaining their physical and/or chemical properties at temperatures substantially above approximately 1000° F. For example, the refractory system may include one or more sets of refractory bricks, which maintain their predetermined physical shape upon exposure to high temperatures such as approximately 1000° F. to 3000° F. (e.g., 2800° F.). For example, the high temperatures may be at least up to or greater than approximately 1000° F., 1500° F., 2000° F., 2500° F., or 3000° F. These refractory bricks may define an annular shape inside the RSC, e.g., via axial, radial, and/or circumferential stacking of the bricks. The refractory system also may include one or more layers or liners of thermally insulative material, e.g., in an annular shape inside the RSC. The refractory system, in certain embodiments, may include a thermally insulative material disposed along the annular seal, a thermally insulative liner disposed radially inside the thermally insulative material, a first plurality of thermally insulative bricks disposed radially inside the thermally insulative liner, and a second plurality of thermally insulative bricks disposed radially inside the first plurality of thermally insulative bricks. The components of the refractory system may cooperate to minimize the surface temperature of the annular seal during operation of the RSC. In these embodiments, the refractory system may substantially block heat transfer to the annular seal, thereby maintaining the annular seal at a sufficiently low temperature. In other words, the refractory system may be used without an active cooling system, e.g., heater exchanger tubes, for the annular seal.

FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius—1600 degrees Celsius, depending on the type of gasifier 106 utilized. The gasification process may include the feedstock undergoing a pyrolysis process, whereby the feedstock is heated. Temperatures inside the gasifier 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed dirty syngas. The gasifier 106 may also generate waste, such as slag 108, which may be a wet ash material. This slag 108 may be removed from the gasifier 106 and disposed of, for example, as road base or as another building material. To clean the dirty syngas, a gas cleaning unit 110 may be utilized. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas, e.g., $NH_3$ (ammonia) and $CH_4$ (methane).

A gas processor 116 may be utilized to remove residual gas components 117 from the clean syngas such as, ammonia and methane, as well as methanol or any residual chemicals. However, removal of residual gas components 117 from the clean syngas is optional, since the clean syngas may be utilized as a fuel even when containing the residual gas components 117, e.g., tail gas. At this point, the clean syngas may include approximately 1-10% CO (e.g., 3% CO), approximately 30-60% $H_2$ (e.g., 55% $H_2$), and approximately 30-60% $CO_2$ (e.g., 40% $CO_2$) and is substantially stripped of $H_2S$. This clean syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
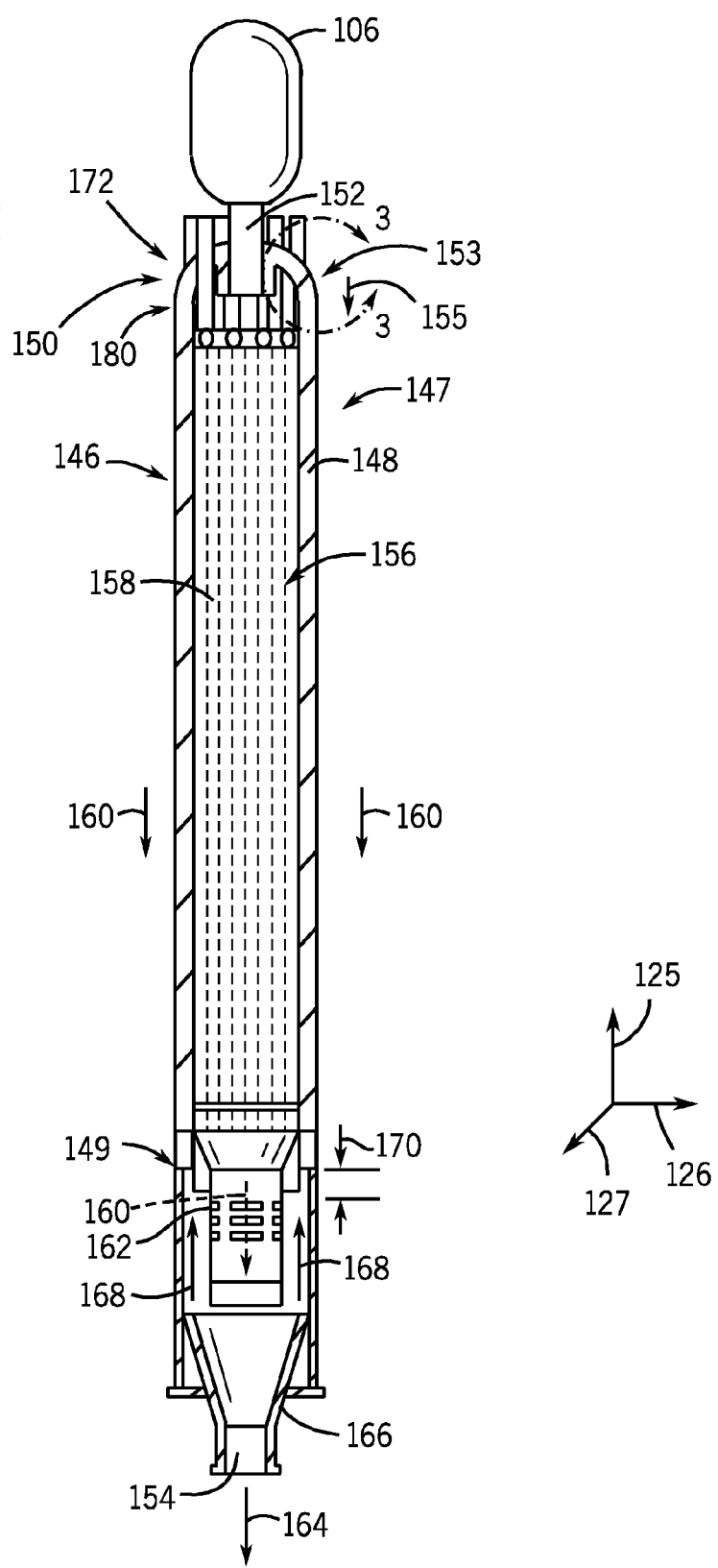
FIG. 2 is a cross-sectional side view of an embodiment of the RSC of FIG. 1.

FIG. 2 is a cross-sectional side view of an embodiment of a radiant syngas cooler (RSC) 146 for use with the IGCC system 100 of FIG. 1. The RSC may have an axial axis 125, a radial axis 126, and a circumferential axis 127. The RSC 146 may include a vessel 148, which may be made of a suitable material such as ASTM SA387, grade 11, class 2. The vessel 148 functions as a housing or outer casing for the RSC 146, enclosing both an upper region 147 of the RSC 146 as well as a lower region 149 of the RSC 146. The upper region 147 of the RSC 146 may include a dome-shaped portion 150 that includes an inlet 152 extending into a throat 153. The lower region 149 includes an outlet 154. An interior region 156 is defined by the space between the inlet 152 and the outlet 154. The throat 153, which is adjacent the inlet 152, expands in a downstream direction 155 from the inlet 152 toward the outlet 154.

The vessel 148 may also include tubing 158, which may be in the upper region 147 of the RSC 146. The tubing 158 may include a plurality of conduits along the radial axis 126 of the RSC 146 and may run parallel in direction with the vessel 148 relative to the axial axis 125. Chilled liquid, such as water, may flow through the tubing 158. Thus, the tubing 158 may act as a heat exchanger within the RSC 146, and may circulate the coolant to an external heat exchanger for removal of heat. Accordingly, the tubing 158 may be made of a thermally resistant material suitable for use with hot syngas, such as ASTM SB407 UNS #8800 (Ed 2004).

During operation, the syngas generated in the gasifier 106 may generally flow in a downward manner parallel to the tubing 158 as indicated by arrows 160. That is, the syngas flows through a gas passage of the RSC 146 that extends in the flow direction 160 lengthwise along the vessel 148. Accordingly, the syngas enters the RSC 146 through the inlet 152, flows lengthwise through the interior region 156 of the RSC 146, and then exits the RSC 146 through the outlet 154. In this manner, the syngas may come in contact with the tubing 158 of the RSC 146 and the fluid flowing through the tubing 158 may act to cool the syngas as it travels through the RSC 146. One result of this cooling process may be the generation of steam in the tubing 158, which may then be transmitted to the high pressure drum 145 (see FIG. 1) for collection and transmission to the heat recovery steam generator 138.

The RSC 146 may also include a conduit 162 in the lower region 149 of the RSC 146 that may aid in directing the cooled syngas and slag out of the RSC 146. For example, as the slag 108 (see FIG. 1) exits the conduit 162, the slag 108 may flow in a generally downward direction 164 to exit the RSC 146 via a quench cone 166. In contrast, the cooled syngas may flow in a general upward direction 168 towards a transfer line 170 as the syngas exits the conduit 162. The transfer line 170 may be used to transmit the syngas to the gas cleaning unit 110 and/or the gas turbine engine 118. The raw syngas may corrode elements of the RSC 146, such as the tubing 158 and/or the inner wall of the vessel 148, if these elements were to come into contact with the syngas. Accordingly, a gas inlet 172 may transmit a non-corrosive fluid, such as a shielding gas 180 (e.g., nitrogen), to the RSC 146. This non-corrosive fluid may flow generally downward between the vessel 148 and the tubing 158 of RSC 146 form a protective barrier, for example, against syngas migration into the annular space between the tubes 158 and the vessel 148.

As will be described in more detail below with respect to FIGS. 3-7, the dome shaped portion 150 of the upper region 147 of the RSC 146 encloses a dome chamber having a unique refractory system and an annular seal. The annular seal is configured to block leakage of the hot syngas from an interior chamber to an outer chamber. In certain embodiments, the annular seal includes a bellows configured to expand and contract with movement (e.g., thermal expansion and contraction) within the RSC 146, thereby maintaining a constant seal to block leakage of the syngas. The refractory system is configured to thermally block heat transfer from the hot syngas to the annular seal as well as the outer chamber. In certain embodiments, the refractory system includes a plurality of refractory bricks and insulative layers configured to thermally shield the annular seal.

Figure 3:
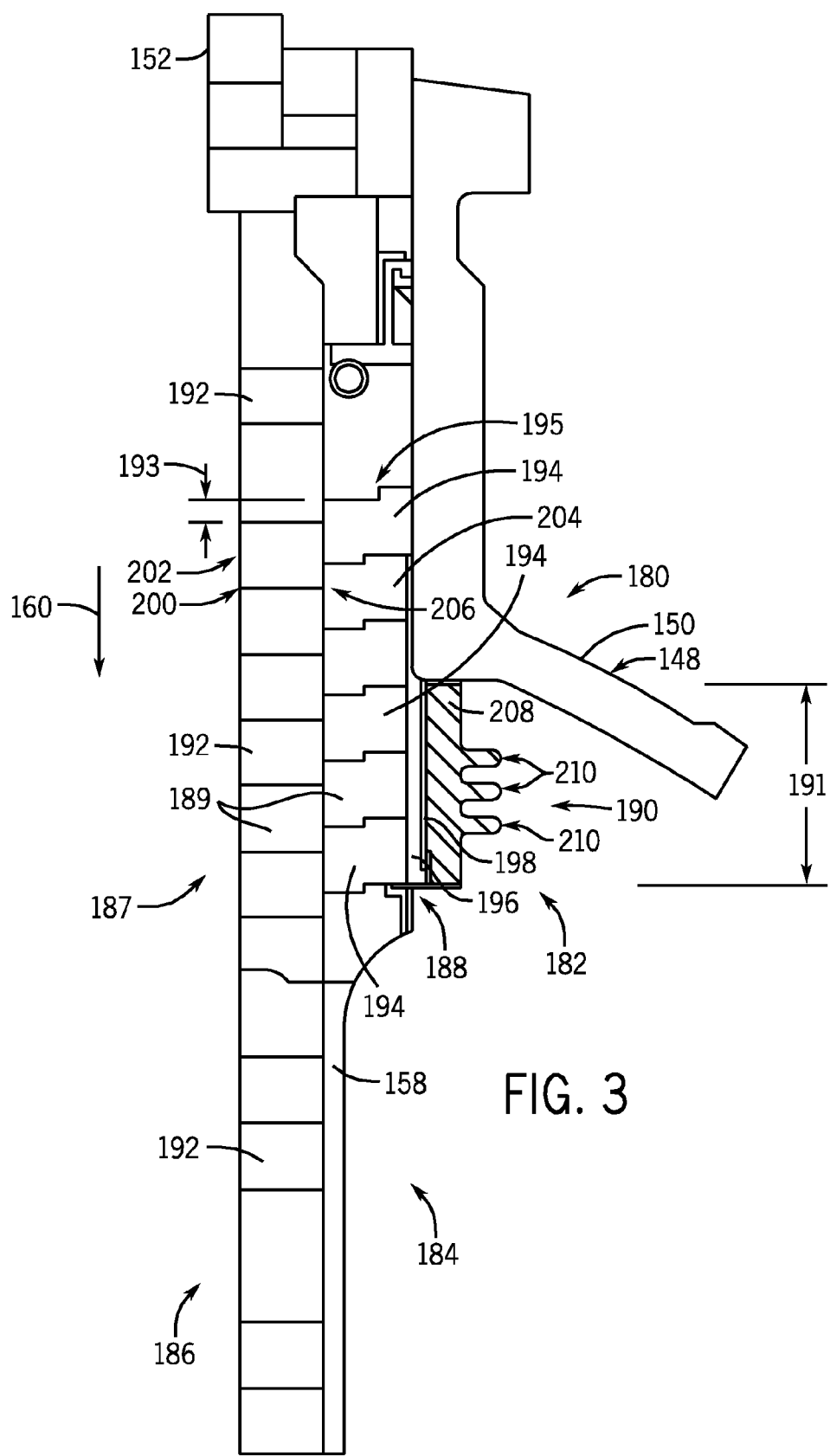
FIG. 3 is a partial cross-sectional view of the RSC of FIG. 2, illustrating an embodiment of a refractory system and an annular seal as shown within line 3-3 of FIG. 2.

FIG. 3 is a partial cross-sectional view of the RSC 146 taken within line 3-3 of FIG. 2, illustrating thermal and mechanical control features located in the dome-shaped portion 150 of the upper region 147 of the RSC 146. The vessel housing 148 separates an exterior 180 of the RSC 146 from an interior 182 of the RSC 146. The interior 182 of the RSC 146 includes a dome chamber 184 (e.g., outer annular chamber) and interior chamber 186 (e.g., central volume or syngas passage) separated by an interior annular wall assembly 187. In the illustrated embodiment, the wall assembly 187 includes a refractory system 188 having a plurality of thermally insulative bricks 189. The illustrated wall assembly 187 also includes an annular seal 190. As discussed in detail below, the wall assembly 187 is configured to block heat transfer and leakage of syngas from the interior chamber 186 to the dome chamber 184 during operation of the RSC 146. In particular, the refractory system 188 employs the thermally insulative bricks 189 (among other insulative features) to reduce heat transfer to the annular seal 190, thereby maintaining a sufficiently low temperature of the annular seal 190 in the dome chamber 184. The annular seal 190 blocks leakage of the syngas from the interior chamber 186 to the dome chamber 184. Thus, the wall assembly 187 relies on both the refractory system 188 and the annular seal 190 to provide a combined barrier against gas flow and heat transfer associated with the hot syngas in the dome-shaped portion 150 of the upper region 147 of the RSC 146.

The annular seal 190 is disposed about the circumference of the interior chamber 186 to block syngas from leaking into the dome chamber 184 during operation. The annular seal 190 may be disposed at any location in the throat 153 of dome-shaped portion 150 of the housing 148. For example, the annular seal 190 may be located completely within a portion 191 of the dome-shaped portion 150, as indicated by arrow 191. In certain embodiments, the portion 191 may correspond to an upstream portion of the dome-shaped portion 150 adjacent the gas inlet 152. For example, the portion 191 may be less than or equal to approximately 10, 20, 30, 40, or 50 percent of the dome-shaped portion 150 at the upstream end adjacent the gas inlet 152. However, certain embodiments of the annular seal 190 may be disposed in any suitable location along the axial axis 125 upstream of the tubes 158 and downstream of the inlet 152.

In the illustrated embodiment, the refractory system 188 may be used in conjunction with the annular seal 190 to ensure that hot syngas entering the RSC 146 from the gasifier 106 does not thermally damage the annular seal 190. The refractory system 188 may include a variety of refractory materials capable of maintaining their physical and/or chemical properties at temperatures substantially above approximately 1000° F. For example, the refractory system 188 may include one or more sets of pre-sintered refractory bricks 189, which maintain their predetermined physical shape upon exposure to high temperatures, such as high temperatures at least up to or greater than approximately 1000° F. to 3000° F. (e.g., 2800° F.). For example, the high temperatures may be at least up to or greater than approximately 1000° F., 1500° F., 2000° F., 2500° F., or 3000° F. Suitable refractory materials for use in the refractory system 188 include ceramics (e.g., clay or minerals), metals (e.g., titanium, tungsten), cermets (i.e., ceramic and metal composites), or other refractory materials (e.g., silica, aluminum oxide).

The thermally insulative bricks 189 of the refractory system 188 may include any number and arrangement of bricks in the axial, radial, and/or circumferential directions. These bricks 189 may interlock with one another to resist gas flow and heat transfer from the interior chamber 186 toward the dome chamber 184. In the illustrated embodiment, the bricks 189 include a first plurality of thermally insulative bricks 192 and a second plurality of thermally insulative bricks 194 in a concentric arrangement relative to one another. In other words, the first plurality of bricks 192 defines a first annular wall defined by bricks stacked axially and circumferentially about the interior chamber 186. Likewise, the second plurality of bricks 194 defines a second annular wall defined by bricks stacked axially and circumferentially about the first plurality of bricks 192. The first and second annular walls (i.e., defined by bricks 192 and 194) are disposed at different diameters, such that the bricks 192 are radially inside the bricks 194. Together, the first and second plurality of bricks 192 and 194 provide radial stacking (e.g., two concentric walls of bricks).

The bricks 189 may include a variety of interlocking features for retention and improved resistance to gas flow and heat transfer. As illustrated, the first plurality of bricks 192 is axially staggered relative to the second plurality of bricks 194, as indicated by axial offset or stagger 193. For instance, a lower edge 200 of a brick 202 abuts a brick 204 at an intersection point 206. However, in other embodiments, the first plurality of bricks 192 and the second plurality of bricks 194 may be axially aligned with one another. In addition, the bricks 192 and 194 may be staggered in the circumferential direction about the interior chamber 186. This staggering helps block heat transfer and gas flow. As discussed further below, the bricks 192 and 194 may have any suitable similar or different shape. As illustrated, the bricks 194 including interlocking interfaces 195 configured to block heat transfer and gas flow in the radial direction, as well as provide additional retention of the bricks 194 in the radial direction.

The bricks 189 may be made of a suitable refractory material, such as chromia or alumina. The first and second plurality of bricks 192 and 194 may be made of the same or different refractory materials. For example, the first plurality of bricks 192 may be made of a refractory material resistant up to a first temperature, while the second plurality of bricks may be made of a refractory material resistant up to a second temperature. The first and second temperatures may be the same or different. For example, the second temperature may be substantially lesser than the first temperature. In certain embodiments, the first plurality of bricks 192 may be made with a refractory material including approximately 90% chromia or approximately 90% alumina. Similarly, the second plurality of bricks 194 may be made with a refractory material including approximately 10% chromia or approximately 90% alumina.

The refractory system 188 also may include one or more thermally insulative layers, liners, or annular barriers disposed between the interior chamber 186 and the annular seal 190. For example, the illustrated system 188 includes a thermally insulative liner 196 (e.g., annular liner) disposed concentrically about the second plurality of thermally insulative bricks 194, and a heat shield 198 (e.g., annular shield) disposed about the thermally insulative liner 196. The thermally insulative liner 196 may be rated to withstand temperatures of approximately 2300-3000° F., have a density of approximately 4-8 lbs/ft$^3$, and have a thermal conductivity of approximately less than 1.0 W/mK. The heat shield 198 may be made of a suitable thermally resistant material, such as ASTM SB 443 UNS 625. As discussed in further detail below, the heat shield 198 and the thermally insulative liner 196 may cooperate with a thermally insulative material 208 (e.g., annular layer) to thermally protect components of the annular seal 190, such as a bellows 210. For example, in one embodiment, the refractory system 188 may reduce the possibility of the annular seal 190 reaching surface temperatures higher than approximately 800° F. during operation. In such an embodiment, the thermally insulative material 208 may be a suitable material rated to withstand temperatures of up to approximately 2300-3000° F. and may have a thermal conductivity of approximately less than 1.0 W/mK.

Figure 4:
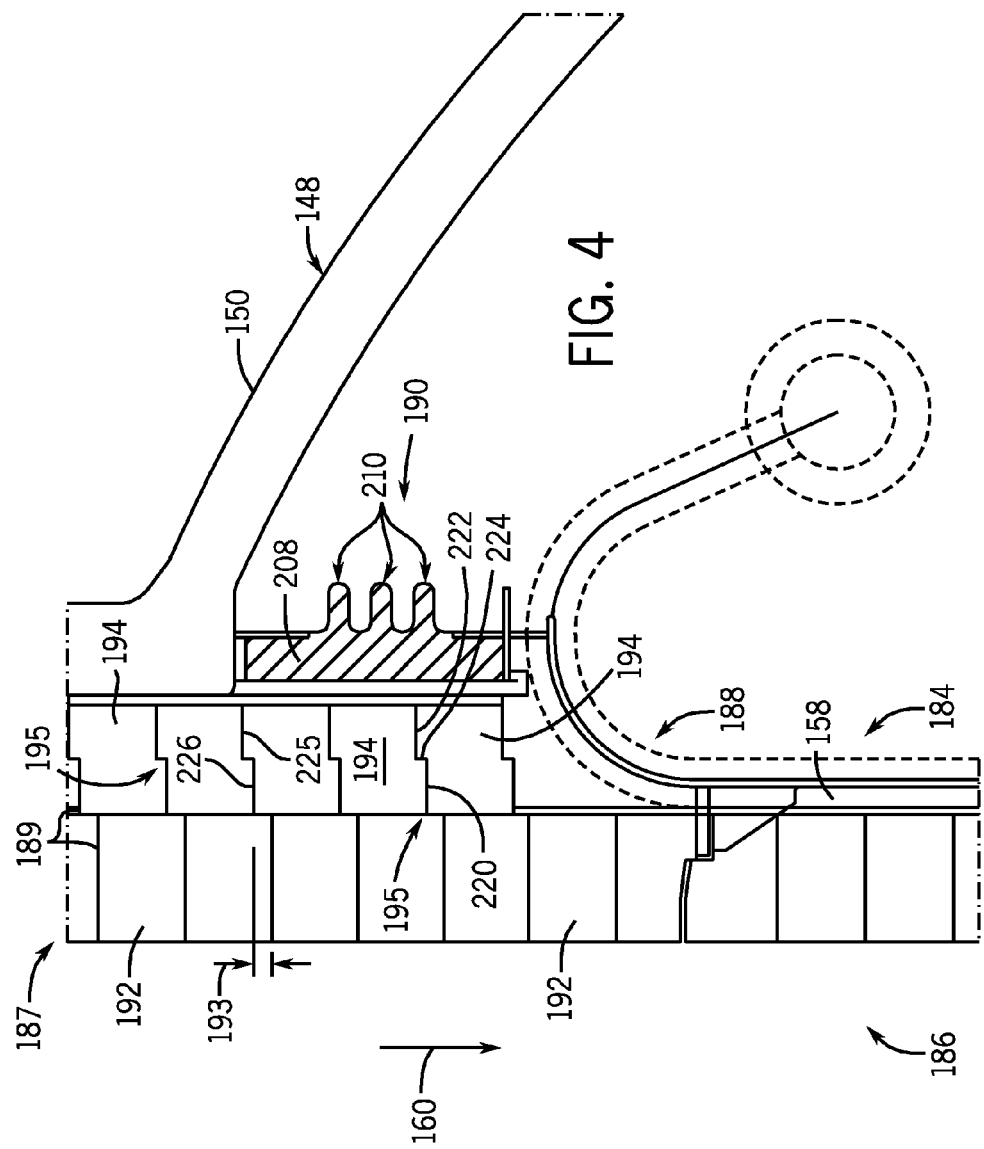
FIG. 4 is a cross-sectional view of an embodiment of an annular seal including a bellows with outward protruding annular grooves.

FIG. 4 is a partial cross-sectional view of the dome-shaped portion 150 of FIG. 3, further illustrating features of the refractory system 188 and the annular seal 190. As mentioned above, the second plurality of bricks 194 include interlocking interfaces 195 configured to provide mechanical retention, blockage of heat transfer, and blockage of gas flow. In the illustrated embodiment, each brick 194 includes an annular protrusion 220, an annular groove 222, and a radial abutment 224 between the annular protrusion 220 and the annular groove 222. The annular protrusion 220 and the annular groove 222 may be described as disc-shaped surfaces at different axial positions, thereby defining the radial abutment 224 as a cylindrical-shaped surface. In this manner, the interlocking interface 195 is formed between adjacent bricks of the second plurality of bricks 194. The interlocking interface 195 may be described as concentric cylindrical portions at different diameters. For example, each interlocking interface 195 may include a first interlocking interface 225 of an upper brick 194 and a second interlocking interface 226 of a lower brick 194, wherein the interfaces 225 and 226 are reverse images (e.g., male and female images) of one another.

In the illustrated embodiment, the radial dimension of the annular protrusion 220 and the annular groove 222 are generally identical to one another. In other words, the radial abutment 224 is located generally at a radial midpoint between an inner diameter and an outer diameter of the second annular wall defined by the bricks 194. As illustrated, each brick 194 has an opposite arrangement of the protrusion 220 and the groove 222 on upper and lower axial faces. In other words, an upper axial face of each brick 194 has the annular groove 222 at a smaller diameter than the annular protrusion 220, while a lower axial face of each brick 194 has the annular groove 222 at a larger diameter than the annular protrusion 220. Thus, the bricks 194 axially stack one over another in a modular manner to build up a thermal barrier, i.e., second annular wall. However, other embodiments may include any suitable interlocking interface 195 between adjacent bricks 194, as well as the bricks 192.

During operation, the interlocking interfaces 195 of the bricks 194 may substantially reduce or eliminate radial expansion due to thermal changes in the RSC 146. In this manner, the bricks 194 reduce or eliminate radial stress on the annular seal 190, including the bellows 210. That is, the interlocking interfaces 195 may securely retain the second plurality of bricks 194, as well as the first plurality of bricks 192 and other layers, in a radial position to reduce or prevent the possibility of flexing or bowing the bellows 210 out of a normal annular shaped geometry. In this manner, the interlocking interfaces 195 protect the annular seal 190, and particularly the bellows 210, from mechanical damage.

In the illustrated embodiment of FIG. 4, the annular seal 190 has the thermally insulative material 208 conformed to the varying shape of the bellows 210, such that the thermally insulative material 208 directly contacts the bellows in the axial, radial, and circumferential directions. As discussed further below, the bellows 210 includes an annular wall that has an alternating diameter that radially increases and decreases in an alternating manner along the gas flow direction 160, and the thermally insulative material 208 conforms to the alternating diameter to maintain contact and insulation of the bellows 210. The illustrated bellows 210 include three outward radial protrusions that extend into the dome chamber 184. In certain embodiments, the bellows 210 may have more or fewer outward radial protrusions, such as 1 to 20, 1 to 10, or 1 to 5, or any other suitable number. In one embodiment, the bellows 210 may be made of a metal material, such as ASTM SB407 UNS #8800 (Ed 2004), suitable for expansion and contraction in the flow direction 160. In other words, the bellows 210 allows for movement of the annular seal 190 in the flow direction 160 without compromising the airtight seal in the throat 153, thereby blocking syngas leakage into the dome chamber 184 during dynamic operating conditions.

It should be noted that due to the thermal shielding or insulating effect of the refractory system 188, the bellows 210 in the illustrated embodiment need not be coupled to an active cooling system (e.g., cooling tubes) for temperature reduction purposes. That is, the refractory system 188 in the presently contemplated embodiments is capable of maintaining a bellows surface temperature of less than approximately 800° F. without circulating a coolant (e.g., water) through a passage adjacent the annular seal 190. For instance, in the illustrated embodiment, properties of the thermally insulative material 208 (e.g., approximately 2300° F. to 3000° F. rating and thermal conductivity of approximately less than 1.0 W/mK) help protect the bellows 210 from thermal damage.

FIGS. 5, 6, and 7 are partial cross-sectional views of the annular seal 190 shown in FIGS. 3 and 4, illustrating alternative embodiments of the bellows 210. In the embodiment of FIG. 5, the bellows 210 has an annular wall 238 that has an alternating diameter that radially increases and decreases in an alternating manner along flow direction 160. In other words, a cross-section of the annular wall 238 may be described as zigzagging or curving back and forth, e.g., to define a plurality of alternating V-shapes, U-shapes, or the like. In the illustrated embodiment, the annular wall 238 defines alternating annular ribs 237 and annular grooves 239 disposed in the dome chamber 184, and the annular seal 190 has the thermally insulative material 208 conforming to the alternating annular ribs 237 and the annular grooves 239. The annular ribs 237 may be described as U-shapes that protrude radially outward into the dome chamber 184, while the annular grooves 239 may be described as U-shapes that recess radially inward into the thermally insulative material 208. The bellows 210 also include a base diameter, as defined by line 240. In the illustrated embodiment, the alternating diameter of the annular wall 238 radially increases and decreases only greater than the base diameter 240. That is, in this embodiment, the annular ribs 237 and the annular grooves 239 are both sized larger than the base diameter 240, such that the ribs 237 and grooves 239 only protrude radially outward with respect to base diameter line 240. As discussed above, the bellows 210 in this configuration may expand and contract in the flow direction 160 during operation in response to system conditions.

Similar to FIG. 5, the bellows 210 of the embodiment of FIG. 6 has an annular wall 250 that has an alternating diameter that radially increases and decreases in an alternating manner along flow direction 160. As before, the annular wall 250 includes alternating annular ribs 251 and annular grooves 252 disposed in the dome chamber 184. However, in contrast to the embodiment of FIG. 5, the alternating diameter of the annular wall 250 radially increases and decreases both greater than and less than the base diameter 240. That is, in this embodiment, the annular ribs 251 protrude radially outward from the base diameter 240 to a larger diameter within the dome chamber 194, whereas the annular grooves 252 recess radially inward from the base diameter 240 to a smaller diameter. As illustrated, the thermally insulative material 208 is disposed along the annular wall 250 in a conforming relationship with the annular ribs 251 and the annular grooves 252. Thus, the thermally insulative material 208 fills the space within the annular ribs 251, while the annular grooves 252 are recessed radially into the thermally insulative material 208. In the illustrated embodiment of FIG. 6, the bellows 210 includes two annular ribs 251 and one annular groove 252. However, in some embodiments, the bellows 210 may have more or fewer annular ribs 251 and annular grooves 252. For example, the bellows 210 may include 1 to 20, 1 to 10, or 1 to 5, annular ribs 251 and annular grooves 252, or any other suitable number.

Similar to FIGS. 5 and 6, the bellows 210 of the embodiment of FIG. 7 has an annular wall 260 that has an alternating diameter that radially increases and decreases in an alternating manner along flow direction 160. In contrast to the embodiments of FIGS. 5 and 6, the annular wall 260 includes alternating annular ribs 261 and annular grooves 262, which are recessed radially into the thermally insulative material 208. That is, the alternating diameter of the annular wall 260 radially increases and decreases only less than the base diameter 240. As before, the bellows 210 in this configuration may expand and contract in the flow direction 160, while maintaining an airtight seal between the interior chamber 186 and the dome chamber 184. Accordingly, the bellows 210 configuration in FIG. 7 may have the effect of blocking syngas leakage into the dome chamber 184.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gasification cooling system comprising:
a housing having an inlet, an outlet, and an interior between the inlet and the outlet, wherein the interior comprises a throat adjacent the inlet, and the throat expands in a flow direction from the inlet toward the outlet to define a gas passage;
a first plurality of thermally insulative bricks disposed about the gas passage;
a second plurality of thermally insulative bricks disposed about the first plurality of thermally insulative bricks;
a seal disposed in the throat of the housing around the second plurality of thermally insulative bricks, wherein the seal comprises a bellows having alternating ribs and grooves, and a thermally insulative material conforming to the alternating ribs and grooves of the bellows;
a thermally insulative liner disposed between the second plurality of thermally insulative bricks and the seal; and
a heat shield comprising thermally resistant material, wherein the heat shield is disposed between the thermally insulative liner and the thermally insulative material.

2. The system of claim 1, wherein the bellows comprises an annular wall having an alternating diameter that radially increases and decreases in an alternating manner along the flow direction to define the alternating ribs and grooves.

3. The system of claim 1, the thermally insulative material extends directly along a wall of the alternating ribs to fill the space within the ribs.

4. The system of claim 1, wherein an upper and a lower axial face of each brick of the second plurality of thermally insulative bricks comprises an annular protrusion, an annular groove, and a radial abutment between the annular protrusion and the annular groove.

5. The system of claim 4, wherein an interlocking interface is formed between axial ends of adjacent bricks when the annular protrusions and grooves of adjacent bricks are received by one another.

6. The system of claim 2, wherein the bellows comprises a base diameter, and the alternating diameter radially increases and decreases both greater than and less than the base diameter.

7. The system of claim 2, wherein the bellows comprises a base diameter, and the alternating diameter radially increases and decreases only greater than the base diameter.

8. The system of claim 2, wherein the bellows comprises a base diameter, and the alternating diameter radially increases and decreases only less than the base diameter.

9. The system of claim 1, wherein the bellows is metal, and the bellows is configured to expand and contract along the flow direction.

10. The system of claim 1, wherein the gasification cooling system comprises heat exchanger tubing disposed downstream in the flow direction from the annular seal inside of the housing.

11. The system of claim 1, wherein the second plurality of thermally insulative bricks is axially staggered relative to the first plurality of thermally insulative bricks.

12. A system, comprising:
a gasification cooling system comprising:
a housing comprising a gas passage extending in a flow direction lengthwise along an axial axis of the housing;
a first plurality of thermally insulative bricks disposed circumferentially about the gas passage and the axial axis of the housing;
a second plurality of thermally insulative bricks disposed circumferentially about the first plurality of thermally insulative bricks and the axial axis of the housing, and comprising an interlocking interface between axial ends of adjacent bricks disposed along the axial axis of the housing to block radial movement between adjacent bricks along a radial axis of the housing, wherein the radial axis extends in a radial direction relative to the axial axis of the housing;
a bellows seal disposed about the second plurality of thermally insulative bricks; and
a plurality of heat exchanger tubes disposed downstream from the bellows seal, wherein the bellows seal is configured to expand and contract in response to thermal contraction or expansion of the plurality of heat exchanger tubes.

13. The system of claim 12, wherein the bellows seal comprises bellows having alternating ribs and grooves, and a thermally insulative material conforming to the alternating ribs and grooves of the bellows.

14. The system of claim 12, wherein the second plurality of thermally insulative bricks is axially staggered relative to the first plurality of thermally insulative bricks.

15. The system of claim 12, wherein the gasification cooling system comprises a thermally insulative liner disposed about the second plurality of thermally insulative bricks.

16. The system of claim 15, wherein the gasification cooling system comprises a thermally insulative material disposed between the thermally insulative liner and the bellows seal.

17. The system of claim 12, wherein an upper and a lower axial face of each brick of the second plurality of thermally insulative bricks comprises an annular protrusion, an annular groove, and a radial abutment between the annular protrusion and the annular groove, and wherein when the interlocking interface is formed between axial ends of adjacent bricks, the annular protrusions and grooves of adjacent bricks are received by one another to form the interlocking interface.

18. A system, comprising:
a gasification cooling system comprising:
a housing comprising a gas passage extending in a flow direction lengthwise along the housing;
a first plurality of thermally insulative bricks circumferentially disposed about the gas passage;
a second plurality of thermally insulative bricks circumferentially disposed about the first plurality of thermally insulative bricks, wherein each brick of the second plurality of thermally insulative bricks comprises:
a first axial surface having a first interlocking interface comprising a first groove, a first protrusion, and a first radial abutment between the first groove and the first protrusion;
a second axial surface having a second interlocking interface comprising a second groove, a second protrusion, and a second radial abutment between the second groove and the second protrusion, wherein the first and second axial surfaces are disposed on axially opposite sides of the brick; and
wherein the first interlocking interface of a first brick mates with the second interlocking interface of a second brick to define an interlocking interface, wherein the first and second bricks of second plurality of thermally insulative bricks are axially stacked one over another, and the interlocking interface blocks radial movement between the first and second bricks;
a thermally insulative liner disposed about the second plurality of thermally insulative bricks;
a bellows seal disposed about the thermally insulative liner and comprising bellows having alternating ribs and grooves;
a thermally insulative material disposed between the thermally insulative liner and the bellows seal; and
a plurality of heat exchanger tubes downstream of the bellows seal, wherein the bellows seal is configured to expand and contract in the flow direction.

19. The system of claim 18, wherein the bellows seal comprises an annular wall having an alternating diameter that radially increases and decreases in an alternating manner along the flow direction.

20. The system of claim 18, wherein the housing comprises a throat in a dome-shaped portion of the housing, and the bellows seal is disposed in a first 40 percent of the dome-shaped portion near a gas inlet into the housing.

* * * * *